(12) United States Patent
Zarkowskyj (10) Patent No.: US 11,780,553 B2
(45) Date of Patent: Oct. 10, 2023

(54) LATCH ASSEMBLY AND AIRCRAFT HAVING SAME

(71) Applicant: The Boeing Company, Chicago, IL (US)

(72) Inventor: Peter J. Zarkowskyj, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 17/669,424

(22) Filed: Feb. 11, 2022

(65) Prior Publication Data

US 2022/0306269 A1    Sep. 29, 2022

Related U.S. Application Data

(60) Provisional application No. 63/164,733, filed on Mar. 23, 2021.

(51) Int. Cl.
| | |
|---|---|
| *B64C 1/14* | (2006.01) |
| *B64C 1/18* | (2006.01) |
| *E05B 51/02* | (2006.01) |
| *B64C 1/00* | (2006.01) |

(52) U.S. Cl.
CPC ............. *B64C 1/1461* (2013.01); *B64C 1/18* (2013.01); *E05B 51/023* (2013.01); *B64C 2001/009* (2013.01)

(58) Field of Classification Search
CPC .... B64C 2001/009; B64C 1/18; E05B 51/023
See application file for complete search history.

(56) References Cited

U.S. PATENT DOCUMENTS

| | | | | |
|---|---|---|---|---|
| 2,994,550 A | * | 8/1961 | White | E05B 81/22 |
| | | | | 292/DIG. 43 |
| 4,230,352 A | * | 10/1980 | Sealey | E05B 65/102 |
| | | | | 292/18 |
| 4,390,152 A | * | 6/1983 | Jorgensen | B64C 1/18 |
| | | | | 244/129.1 |

(Continued)

FOREIGN PATENT DOCUMENTS

EP    1197619 B1    8/2006

OTHER PUBLICATIONS

European Patent Office, European Search Report for App. No. EP22160284.0, dated Aug. 23, 2022.

*Primary Examiner* — Richard Green
*Assistant Examiner* — Madison Elizabeth Dittner
(74) *Attorney, Agent, or Firm* — Quinn IP Law (57) ABSTRACT

A latch assembly for a decompression panel in an aircraft includes a base and a swing arm hinged to the base and pivotable relative to the base about a hinge axis between a latched position and an unlatched position. A load pin fixed to the swing arm has a pin axis a fixed distance from the hinge axis. A spring secured to the base is positioned to exert a spring force against the swing arm when the swing arm pivots from the latched position to the unlatched position. A bracket securable to the decompression panel defines a slot retaining the load pin when the swing arm is in the latched position. The load pin is movable in the slot under relative motion of the bracket and the base with the swing arm in the latched position, and exits the slot when the swing arm pivots to the unlatched position.

20 Claims, 9 Drawing Sheets

(56) References Cited

U.S. PATENT DOCUMENTS

| | | | | |
|---|---|---|---|---|
| 5,048,239 A * | 9/1991 | Filitz | ............... | B64C 1/18 |
| | | | | 49/465 |
| 5,118,053 A * | 6/1992 | Singh | ............... | B64C 1/18 |
| | | | | 244/129.1 |
| 6,129,312 A * | 10/2000 | Weber | ............... | B64C 1/18 |
| | | | | 244/129.4 |
| 6,513,841 B1 * | 2/2003 | Jackson | ............... | B64D 29/06 |
| | | | | 292/79 |
| 6,866,226 B2 * | 3/2005 | Pratt | ............... | B64D 45/0028 |
| | | | | 244/129.4 |
| 7,571,877 B2 * | 8/2009 | French | ............... | E05B 51/023 |
| | | | | 16/61 |
| 8,393,577 B2 * | 3/2013 | Roth | ............... | B64C 1/066 |
| | | | | 244/129.5 |
| 8,459,701 B2 * | 6/2013 | Szarszewski | ............... | B64C 1/18 |
| | | | | 244/129.4 |
| 8,696,418 B1 * | 4/2014 | Griffin | ............... | B64D 13/00 |
| | | | | 454/76 |
| 9,114,869 B1 * | 8/2015 | Barrett | ............... | B64C 1/1469 |
| 9,169,678 B2 * | 10/2015 | Rozema | ............... | E05B 51/023 |
| 11,130,579 B2 * | 9/2021 | Insel | ............... | F16K 17/196 |
| 2007/0164572 A9 | 7/2007 | Pratt et al. | | |
| 2008/0054123 A1 * | 3/2008 | French | ............... | E05B 51/023 |
| | | | | 292/205 |
| 2009/0118876 A1 | 5/2009 | Yadollahi | | |
| 2013/0043350 A1 * | 2/2013 | Defrance | ............... | E05B 51/023 |
| | | | | 244/131 |
| 2019/0352946 A1 * | 11/2019 | Yadollahi | ............... | B64C 1/1461 |
| 2020/0224462 A1 * | 7/2020 | Renner | ............... | E05B 81/64 |

* cited by examiner

LATCH ASSEMBLY AND AIRCRAFT HAVING SAME

CROSS-REFERENCE TO RELATED APPLICATION

The present application claims the benefit of priority to U.S. Provisional Application No. 63/164,733 filed Mar. 23, 2021, which is hereby incorporated by reference in its entirety.

TECHNICAL FIELD

The disclosure relates to a latch assembly for an aircraft and more particularly to a decompression latch assembly for an aircraft decompression panel.

BACKGROUND

Aircraft passenger compartments are pressurized in order to maintain comfortable oxygen levels for passengers and crew when cruising at high altitudes where ambient pressure is low and the air is thin. Adjacent compartments, such as a crown area or a cargo area, are divided from the passenger compartment by aircraft structure, such as stowage bins, ceilings, or floors. In the event of a decompression of a pressurized area, a pressure differential larger than desired could develop between the adjacent compartments. Aircraft may be equipped with closure panels that automatically open under a pressure differential to reduce the pressure differential. For example, latch assemblies are sometimes used that release a panel under a predetermined pressure differential on opposite sides of the panel.

SUMMARY

A latch assembly for a decompression panel in an aircraft includes a base and a swing arm. The swing arm is hinged to the base and is pivotable relative to the base between a latched position and an unlatched position. A load pin is fixed to the swing arm. A spring is secured to the base and is positioned to exert a spring force against the swing arm when the swing arm pivots from the latched position to the unlatched position. A bracket is securable to the decompression panel and defines a slot having an open end. The bracket is configured to retain the load pin in the slot when the swing arm is in the latched position. The load pin is movable in the slot under relative motion of the bracket and the base with the swing arm in the latched position, and the load pin exits the open end of the slot when the swing arm pivots from the latched position to the unlatched position under a force of the bracket on the load pin due to a pressure differential on the decompression panel. The force of the bracket on the load pin creates a moment on the swing arm that overcomes the spring force.

The swing arm may be pivotable relative to the base about a hinge axis between a latched position and an unlatched position. The load pin may have a pin axis a fixed distance from the hinge axis.

By securing the load pin to a moving part of the latch assembly (e.g., the swing arm) and configuring the swing arm and the bracket to function as a slip joint relative motion between the panel and aircraft structure to which the base is secured, such as may result from normal air turbulence, does not cause a variation in the magnitude of the force necessary to trigger the latch assembly. Such relative motion may be referred to as non-triggering relative motion. For example, a moment arm of the load pin from the hinge axis to the pin axis remains constant despite any such relative motion.

In an example, the spring may be a beam spring having a fixed end and a supported end that floats on a support rod fixed to the base. The spring deflects between the fixed end and the supported end when the swing arm pivots from the latched position to the unlatched position. The spring may be a flat spring, such as a flat steel spring. The simplicity of a flat steel spring enables a highly accurate spring force determined by the thickness of the spring, and not dependent upon the geometry of bends or other features that may relax and cause a change in spring force over time. Moreover, as a flat spring may be symmetrical, it may be installed with either side facing the swing arm, simplifying installation.

Additionally, a shim may be disposed between the base and the spring. The shim may be used to adjust the spring force exerted by the spring on the swing arm. A sum of a thickness of the shim and a thickness of the spring affect the spring force of the spring acting against the swing arm when the swing arm moves from the latched position to the unlatched position.

A plate may be disposed over the spring nearer to the fixed end of the spring than the supported end of the spring. The plate is securable to the base with the spring sandwiched between the base and the plate. The plate helps to evenly distribute a securing force at the fixed end of the spring.

In an implementation, the spring may be steel, and a coating may be disposed on the spring. The swing arm may contact the coating when pivoting from the unlatched position to the latched position. The coating lessens wear that could otherwise occur due to rubbing of the swing arm against the spring when in the latched position as a result of the relative motion of the components during aircraft travel. For similar reasons, a sleeve may be disposed around the load pin such that the sleeve, rather than the load pin, interfaces with the bracket in the slot.

Still further, to prevent rattling and wear due to the non-triggering relative motion, the spring may exert a preload on the swing arm when the swing arm is in the latched position and/or may exert a preload on the swing arm when the swing arm is in the unlatched position.

In an implementation, the swing arm includes a cam having a profile configured to deflect the spring when the swing arm pivots from the latched position to the unlatched position. The profile of the cam may be configured such that a maximum deflection of the spring is between the latched position and the unlatched position. The cam profile thus helps to maintain the swing arm in the latched position until the bracket exerts at least a force of the predetermined magnitude acts on the load pin.

Additionally, the base may include a support that prohibits pivoting of the swing arm from the latched position in a direction away from the unlatched position. Stated differently, the support acts as a stop that blocks the swing arm from pivoting beyond the latched position. A compressible pad may be disposed on the support and may interface with the swing arm when the swing arm is in the latched position, dampening any rattle between the parts. Similarly, the base may include a support prohibiting pivoting of the swing arm from the unlatched position in a direction away from the latched position, and a compressible pad may be disposed on the support and may interface with the swing arm when the swing arm is in the unlatched position. This support acts as a stop that blocks the swing arm from pivoting beyond the unlatched position.

An aircraft decompression system is disclosed for an aircraft. The aircraft has a fuselage, a first structure within the fuselage, and a second structure within the fuselage and spaced apart from the first structure. The fuselage, the first structure, and the second structure define a first space and a second space within the fuselage. The aircraft decompression system includes a decompression panel pivotably secured to the first structure and configured to at least partially span an opening between the first structure and the second structure in a closed position to at least partially separate the first space from the second space. The aircraft decompression system further includes a latch assembly that has a base fixed to the second structure, and a swing arm hinged to the base and pivotable relative to the base between a latched position and an unlatched position. The decompression panel is in the closed position when the swing arm is in the latched position. A load pin is fixed to the swing arm. A spring is secured to the base and is positioned to exert a spring force against the swing arm when the swing arm pivots from the latched position to the unlatched position. A bracket is secured to the decompression panel. The bracket defines a slot having an open end. The bracket retains the load pin in the slot when the swing arm is in the latched position. The load pin is movable in the slot under relative motion of the bracket and the base with the swing arm in the latched position. The load pin releases from the bracket out of the open end of the slot when the swing arm pivots from the latched position to the unlatched position under a predetermined force of the bracket on the load pin due to a positive pressure differential between the first space and the second space. The predetermined force of the bracket on the load pin creates a moment on the swing arm that overcomes the spring force, and the decompression panel pivots away from the opening into the second space.

In an implementation of the aircraft decompression system, the first structure may be an outboard bin, the second structure may be an inboard bin, the first space may be a passenger cabin, the second space may be a crown space, and the decompression panel may be a ceiling panel. In such an implementation, unlatching of the latch assembly and the associated pivoting of the ceiling panel to the open position vents the passenger cabin into the crown space through the opening to reduce the difference between the pressures in the passenger cabin and the crown space.

A method of installing a decompression latch assembly in an aircraft is disclosed. The aircraft has a fuselage, a first structure, a second structure, and a decompression panel within the fuselage. The fuselage, the first structure, and the second structure at least partially define a first space and a second space within the fuselage. The decompression panel at least partially spans an opening between the first structure and the second structure in a closed position of the decompression panel to at least partially separate the first space from the second space. The method includes securing a bracket of the decompression latch assembly to the decompression panel. The bracket defines a slot with an open end opening toward the second structure. The method includes fixing a base of the decompression latch assembly to the second structure, and inserting a load pin into the open end of the slot. The load pin is fixed to a swing arm that is hinged to the base. The swing arm is pivotable relative to the base between a latched position and an unlatched position when a predetermined force is applied to the load pin by the bracket. The load pin is movable in the slot under relative motion of the bracket and the base with the swing arm in the latched position.

In an implementation, the method may further include securing the decompression panel to the first structure with a fixed latch assembly such that the decompression panel is pivotably secured to the first structure and pivots relative to the first structure at the fixed latch assembly when the swing arm pivots from the latched position to the unlatched position.

Additionally, the method may include inserting a shim between the base and a spring of the decompression latch assembly to adjust a magnitude of a spring force exerted by the spring against the swing arm and a magnitude of the predetermined force applied to the load pin at which the swing arm pivots.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

A latch assembly disclosed herein enables decompression of a space, such as an aircraft passenger cabin or other space, by unlatching in response to a pressure differential across the panel to allow the panel to open to vent the space. The design of the latch assembly accounts for normal relative motion between the panel and aircraft structure to which the latch assembly latches the panel so that the latch assembly will not be unnecessarily triggered by the relative motion. Additionally, the latch assembly is configured so that the relative motion does not affect the force at which the latch assembly is triggered to open.

Figure 1:
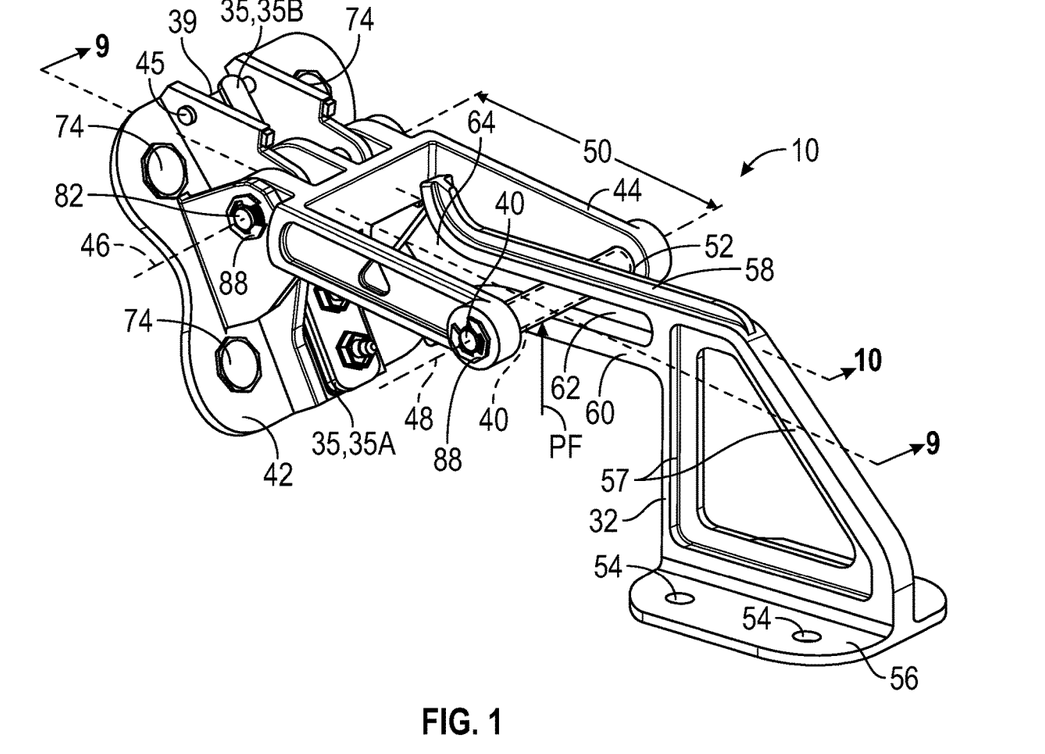
FIG. 1 is a perspective view of an example decompression latch assembly in a latched position.
Figure 2:
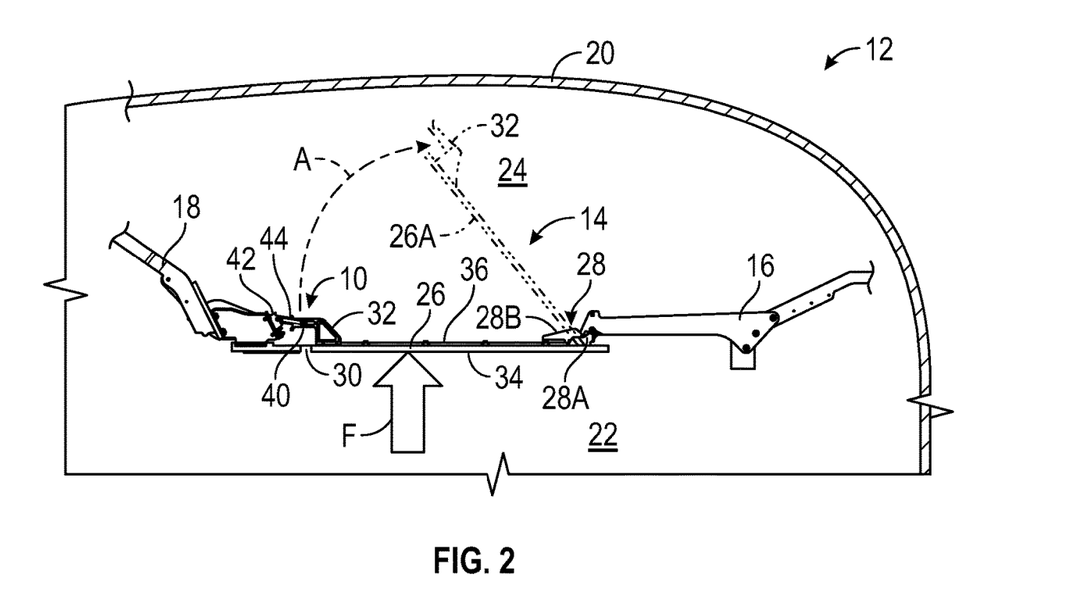
FIG. 2 is a fragmentary schematic view of an aircraft having structure separating adjacent aircraft compartments, and including the decompression latch assembly latching a ceiling panel to an overhead bin.

Referring to the drawings, wherein like reference numbers refer to like components, FIG. 1 shows a decompression latch assembly 10 for an aircraft 12 having an aircraft decompression system 14, shown in FIG. 2. The decompression latch assembly 10 may be referred to as a decompression latch assembly, or a pressure relief latch assembly. The decompression latch assembly 10 has a latched state, shown in FIGS. 1, 2, 7, 9, and 10, and an unlatched state, shown in phantom in FIG. 2 and shown in FIG. 12.

With reference to FIG. 2, the aircraft 12 has a first structure 16 and a second structure 18 spaced apart from the first structure 16 within a fuselage 20. In the example shown, the first structure 16 is an outboard bin, and the second structure 18 is a center bin. The fuselage 20, the first structure 16, and the second structure 18 of the aircraft 12 define and encloses a first space 22, shown as a passenger cabin, and a second space 24, shown as a crown space. The first space 22 may be referred to as a first compartment 22, and the second space 24 may be referred to as a second compartment 24. A portion of the fuselage 20 is shown in FIG. 2, and it should be appreciated that the fuselage 20 surrounds the first space 22 and the second space 24 to isolate these and other compartments of the aircraft 12 from the surrounding atmosphere.

The aircraft decompression system 14 includes the decompression latch assembly 10, as well as a decompression panel 26, which in the example shown is a ceiling panel. The decompression panel 26, the outboard bin 16, the center bin 18, and other aircraft structure separates the first space 22 from the second space 24. It should be appreciated that the first and second structures 16, 18 are not limited to bins, the decompression panel 26 is not limited to a ceiling panel, and the first and second spaces 22, 24 are not limited to a passenger cabin and crown space. In other examples, the decompression panel 26 may be a panel of a wall or a floor (instead of a ceiling panel), for example, the first compartment could be the cockpit instead of the passenger cabin and/or the second compartment could be a cargo space, for example.

The decompression panel 26 is pivotably secured to the first structure 16 with a fixed latch assembly 28. The fixed latch assembly 28 is referred to as fixed because it is configured so that the decompression panel 26 can pivot at the fixed latch assembly 28 relative to the first structure 16, but remains fixed to the first structure 16 by the fixed latch assembly 28. The fixed latch assembly 28 has a first latch portion 28A fixed to the first structure 16, and a second latch portion 28B fixed to the decompression panel 26. The second latch portion 28B is hinged to the first latch portion 28A so that it pivots relative to the first latch portion 28A with the decompression panel 26. Only one fixed latch assembly 28 is visible in side view in FIG. 2, but there may be more than one fixed latch assembly 28 spaced along the end of the decompression panel 26 closest to the fixed structure 16 and pivotably securing the decompression panel 26 to the first structure 16.

The decompression latch assembly 10 has a bracket 32 fixed to the decompression panel 26 in the second space 24 at an end of the decompression panel 26 closest to the second structure 18. Only one decompression latch assembly 10 is shown in the side view of FIG. 2 but, like the fixed latch assembly 28, there may be two or more than two decompression latch assemblies 10 spaced along the end of the decompression panel 26 nearest the second structure 18.

The decompression panel 26 spans an opening 30 between the first structure 16 and the second structure 18 when the decompression latch assembly 10 is in the latched position shown in FIG. 2 to at least partially separate the first space 22 from the second space 24 at the opening 30. The edge of the opening 30 is indicated in FIG. 2, and the opening 30 extends the width and length of the decompression panel 26 (e.g., from the fixed latch assembly 28 to the decompression latch assembly 10). Accordingly, air pressure in the first space 22 acts on a first side 34 of the decompression panel 26 (the bottom side in FIG. 2) and air pressure in the second space 24 acts on a second side 36 of the decompression panel 26 (the top side in FIG. 2). The decompression panel 26 is said to at least partially span the opening 30 to at least partially separate the first space 22 from the second space 24 as it need only separate the spaces 22, 24 sufficiently to maintain a pressure differential less than the predetermined pressure differential at which the decompression latch assembly 10 unlatches.

Air is pressurized in the first space 22 during flight to maintain comfort for passengers and crew in light of the thin air of the surrounding atmosphere at high altitudes. The second space 24 need not be pressurized to the pressure level of the first space in order for it to serve its purposes, which may include containing and routing electrical, pneumatic, and other aircraft systems. In order to help maintain the desired pressure level in the first space, the decompression latch assembly 10 is configured to remain in the latched state when the pressure differential on the decompression panel 26 due to the pressurized first space 22 is less than a predetermined magnitude.

As discussed herein, a spring 35 (best shown in FIGS. 8-12 and 18) is secured to the base 42 and is positioned to bias the swing arm 44 to the latched position shown in FIG. 1 and exert a spring force when the swing arm 44 pivots from the latched position to the unlatched position. However, in the event that a pressure differential between the first space 22 and the second space 24 increases such that a net force F acting on the first side 34 of the decompression panel 26 results in at least a predetermined force PF of the bracket 32 on a load pin 40 of the decompression latch assembly 10, a moment is created on the swing arm 44 that will overcome the biasing force of the spring 35. The decompression latch assembly 10 will unlatch, allowing the decompression panel 26 to pivot at the fixed latch assembly 28 away from the first space 22 in the direction of arrow A to an open position in which the decompression panel 26 is shown in phantom at position 26A, lifted into the second space 24. Opening of the decompression panel 26 allows pressure in the first space 22 to vent through the opening 30 into the lower pressure second space 24 to reduce the pressure differential.

Referring again to FIG. 1, in addition to the bracket 32, the decompression latch assembly 10 includes a base 42 and the swing arm 44. The swing arm 44 is hinged to the base 42 and is pivotable relative to the base 42 about a hinge axis 46 between the latched position and the unlatched position. The load pin 40 is fixed to the swing arm 44 and has a pin axis 48 a fixed distance 50 from the hinge axis 46. The distance 50 may be referred to as the moment arm of the load pin 40. A sleeve 52 may be disposed around the load pin such that the load pin 40 extends through the sleeve 52.

The bracket 32 is securable to the decompression panel 26 such as by bolts or screws that may extend through fastener openings 54 in a flange 56 of the bracket 32 so that the bracket 32 extends proud from the decompression panel 26 in the second space 24, as shown in FIG. 2. The bracket 32 has two elongated bars 58, 60 that are spaced apart from one another to define a slot 62 between the bars 58, 60. The bars 58, 60 extend from a brace portion 57 of the bracket 32 outward toward the base 42 when the decompression latch assembly 10 is installed in the aircraft 12 as shown in FIG. 2. The slot 62 has an open end 64 directed toward the base 42.

Figure 13:
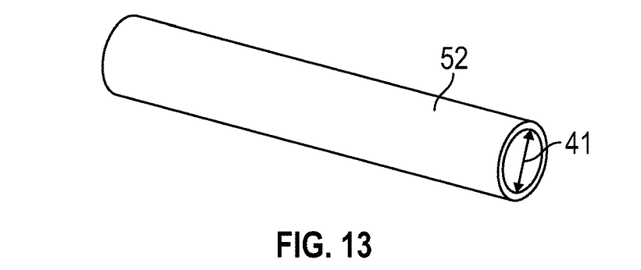
FIG. 13 is perspective view of a sleeve for a load pin of the decompression latch assembly.

As shown in FIG. 1, the bracket 32 is configured to retain the load pin 40 in the slot 62 when the swing arm 44 is in the latched position. As shown in FIG. 2, the decompression panel 26 is in the closed position when the swing arm 44 is in the latched position. The sleeve 52, rather than the load pin 40, interfaces with the bracket 32 in the slot 62. In an example, the bracket 32, the base 42, and the swing arm 44 may each be an aluminum alloy. The load pin 40 may be but is not limited to stainless steel. The sleeve 52 may be nylon and may have an internal diameter 41 (see FIG. 13) that fits to the external diameter 43 (see FIG. 14) of the load pin 40 so that the sleeve 52 surrounds the load pin 40. Using a sleeve 52, such as a nylon sleeve, reduces friction with the bars 58, 60 in comparison to the stainless steel load pin 40, reducing wear with relative motion and easing exit of the load pin 40 from the slot 62 during unlatching.

Figure 5:
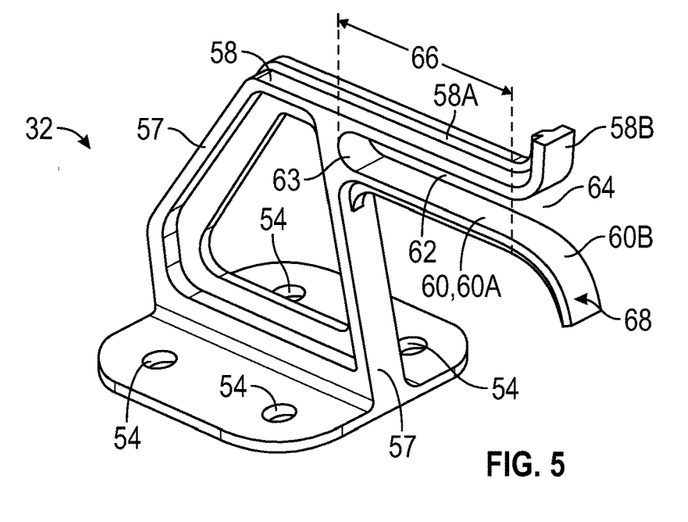
FIG. 5 is a perspective view of a bracket of the decompression latch assembly.

Referring to FIG. 5, each of the bars 58, 60 has a straight portion 58A, 60A, respectively, and a curved end 58B, 60B, respectively. The curved ends 58B, 60B diverge apart from one another. The slot 62 has a length 66 along the straight portions 58A, 60A that is sufficient to allow expected relative motion in a direction along the slot 62 that may occur between the decompression panel 26 and the second structure 18 during flight so that the load pin 40 remains in the slot 62 and the swing arm 44 remains in the latched position until a triggering predetermined force PF on the load pin 40 causes unlatching.

The load pin 40 will exit the open end 64 of the slot 62 during unlatching. The load pin 40 and sleeve 52 will move along a convex surface 68 at the curved end 60B of the bar 60 when exiting the open end 64, allowing the bar 60 to continue transferring the force PF to the swing arm 44 as the swing arm 44 pivots toward the unlatched position, ensuring that the swing arm 44 overcomes the biasing force of the spring 35 and is pushed by the bracket 32 to the unlatched position.

Accordingly, the swing arm 44 and the bracket 32 function as a slip joint due to the ability of the load pin 40 to move within the slot 62 without exiting the slot 62 until a triggering predetermined force PF is applied by the bracket 32. By securing the load pin 40 to a moving part of the decompression latch assembly 10 (e.g., the swing arm 44) and configuring the swing arm 44 and the bracket 32 to function as a slip joint allowing relative motion between the decompression panel 26 and the second structure 18 to which the base 42 is secured, the magnitude of the predetermined force necessary to trigger the latch assembly 10 is not varied due to the relative motion as it would be if the load pin 40 were instead fixed to the bracket 32, in which case the moment arm of the load pin 40 to the hinge axis 46 would vary with the relative motion. Instead, a moment arm (fixed distance 50) of the load pin 40 from the hinge axis 46 to the pin axis 48 remains constant despite such relative motion.

Figure 3:
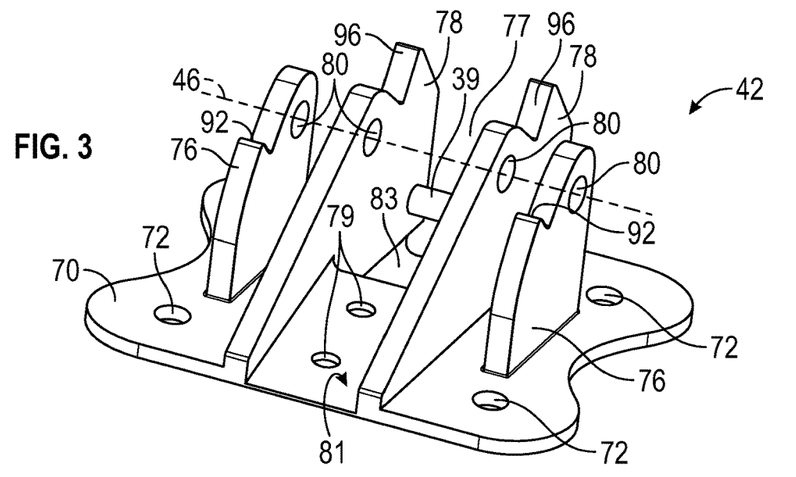
FIG. 3 is a perspective view of a base of the decompression latch assembly.

Referring to FIG. 3, the base 42 include includes a flange 70 with a plurality of fastener openings 72 through which fasteners extend to secure the base 42 to the second structure 18. Fasteners 74 are shown in FIG. 1. The base 42 includes outer supports 76 and inner supports 78 that extend outward from the flange 70. The inner supports 78 are spaced apart from one another by a spacing 77 sufficient to allow a fixed end 35A of the spring 35 to be disposed on a surface 81 of the flange 70 at fastener openings 79 (see FIG. 9). Each support 76, 78 includes a hinge pin opening 80, and the hinge pin openings 80 are aligned with one another and together define the hinge axis 46.

Figure 18:
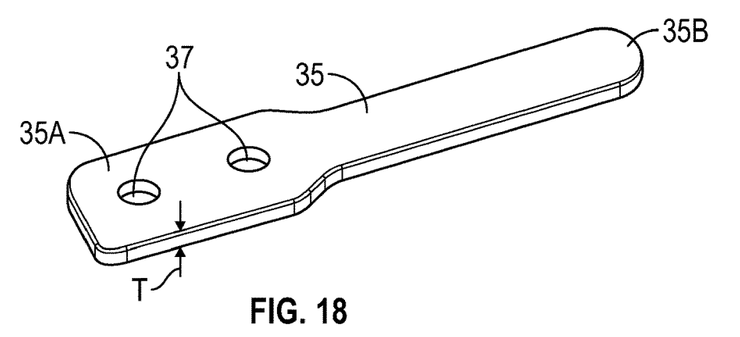
FIG. 18 is a perspective view of the spring.

The spring 35 is shown in FIG. 18 as a flat spring of uniform thickness T with a fixed end 35A and a supported end 35B. The spring 35 has openings 37 spaced to align with the openings 79 when secured to the base 42 of FIG. 3. The fixed end 35A is referred to as fixed because it is secured to the base 42 as discussed herein and does not deflect when the swing arm 44 pivots. The supported end 35B floats on a support rod 39 that is fixed to the base 42. The surface 81 of the flange 70 angles outward to create a recess 83 in the spacing 77 that gives the spring 35 room to bend between the fixed end 35A and the supported end 35B when moved by the swing arm 44. The supported end 35B is referred to as floating because it rests on but is not fixed to the support rod 39 and slides against the support rod 39 as the spring 35 deflects (bends) to allow the swing arm 44 to move from the latched position to the unlatched position.

As shown, the support rod 39 may include an outer sleeve 39A that the supported end 35B contacts, and an inner pin 39B. Similar to sleeve 52 on the load pin 40, the outer sleeve 39A may be nylon and may have an internal diameter that fits to the external diameter of the inner pin 39B so that the outer sleeve 39A surrounds the inner pin 39B. The inner pin 39B may extend through openings in the inner supports 78 and be secured to the supports via a screw 45 integral with or extending through the inner pin 39B and a lock nut 47, for example. Using an outer sleeve 39A, such as a nylon sleeve, reduces friction with the supported end 35B in comparison to the inner pin 39B, which may be steel, for example, reducing wear.

A spring force of the spring 35 against the swing arm 44 is dependent upon the material of the spring 35 and the thickness T, which are selected to provide a spring stiffness that causes the spring 35 to deflect sufficiently to allow the swing arm 44 to unlatch when the predetermined force PF at which the aircraft decompression system 14 is designed to open the decompression panel 26 acts upon the load pin 40.

Figure 4:
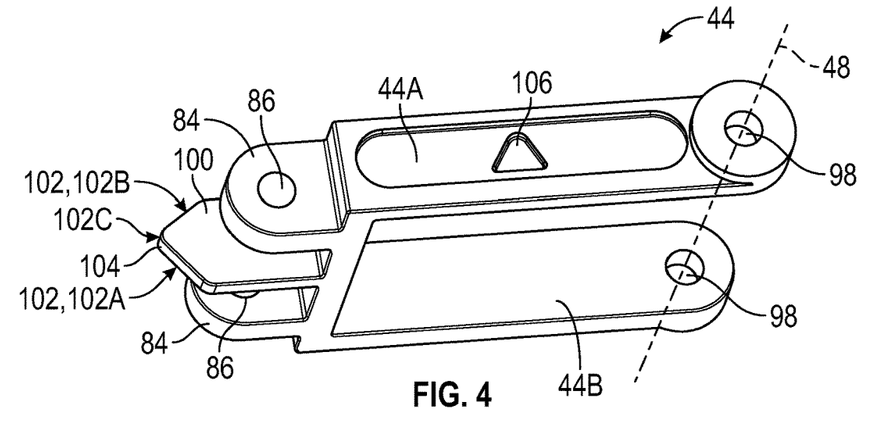
FIG. 4 is a perspective view of a swing arm of the decompression latch assembly.
Figure 8:
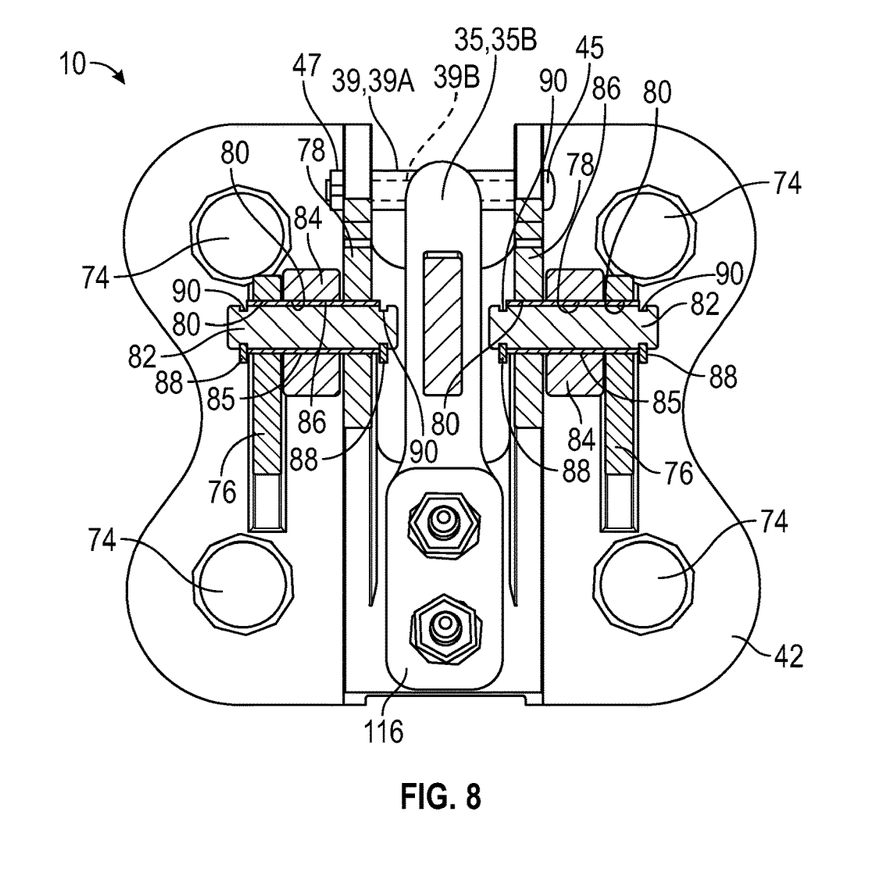
FIG. 8 is a cross-sectional view of the decompression latch assembly taken at lines 8-8 in FIG. 7.

Referring to FIG. 4, the swing arm 44 includes two spaced knuckles 84 each of which defines a hinge pin opening 86 which aligns with the hinge pin openings 80 along the hinge axis 46. As best shown in FIG. 8, two hinge pins 82 are used to connect the swing arm 44 (only knuckles 84 shown in FIG. 8) to the base 42. Each hinge pin 82 extends through the openings 80 of one inner support 78 and one outer support 76. The hinge pin opening 86 of one of the knuckles 84 is disposed between the pair of inner and outer supports 76, 78.

Figure 15:
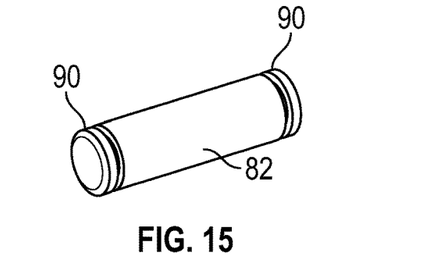
FIG. 15 is a perspective view of a hinge pin of the decompression latch assembly.
Figure 20:
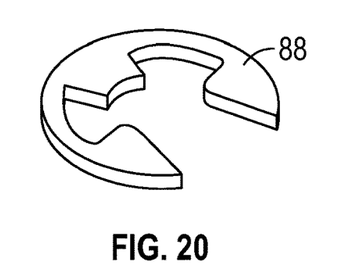
FIG. 20 is a perspective view of a C-clip for the load pin of FIG. 13 and the hinge pin of FIG. 15.

Clips 88, referred to herein as C-clips 88, fit within grooves 90 of the hinge pins 82 to retain the hinge pins 82 in the openings 80, 86. As used herein, a C-clip is a retaining ring with open ends that can be snapped into place in a pin, rod, or shaft, such as in the grooves 90 in hinge pins 82, to permit rotation but to act as a barrier to prevent lateral movement of an object adjacent to the C-clip on the pin. One C-clip 88 is shown in FIG. 20 and one hinge pin 82 with grooves 90 is shown in FIG. 15.

Figure 19:
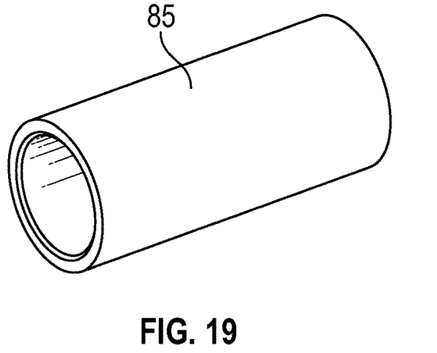
FIG. 19 is a perspective view of a sleeve for the hinge pin of FIG. 15.

The hinge pins 82 may be but are not limited to stainless steel. Two hinge sleeves 85 may be used, each extending around the outer diameter of a respective hinge pin 82 between the grooves 90 of the hinge pin 82 so that the hinge sleeve 85 interfaces with the swing arm 44 at the openings 86 and with the supports 76, 78 at the openings 80 to reduce friction and wear on the hinge pins 82. A hinge sleeve 85 is also shown in FIG. 19. The hinge sleeves 85 may be but are not limited to nylon.

Figure 7:
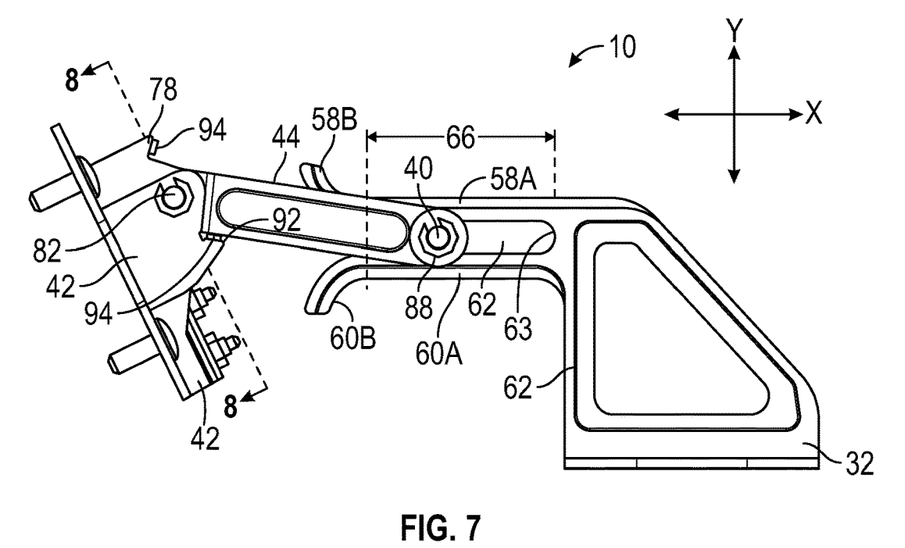
FIG. 7 is a side view of the decompression latch assembly in the latched position.
Figure 9:
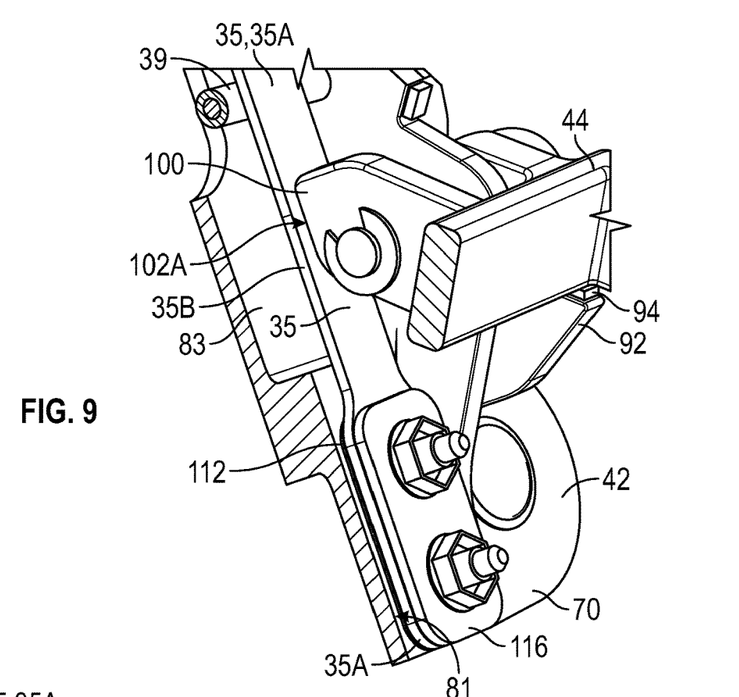
FIG. 9 is a perspective cross-sectional view of the decompression latch assembly taken along lines 9-9 in FIG. 1.
Figure 10:
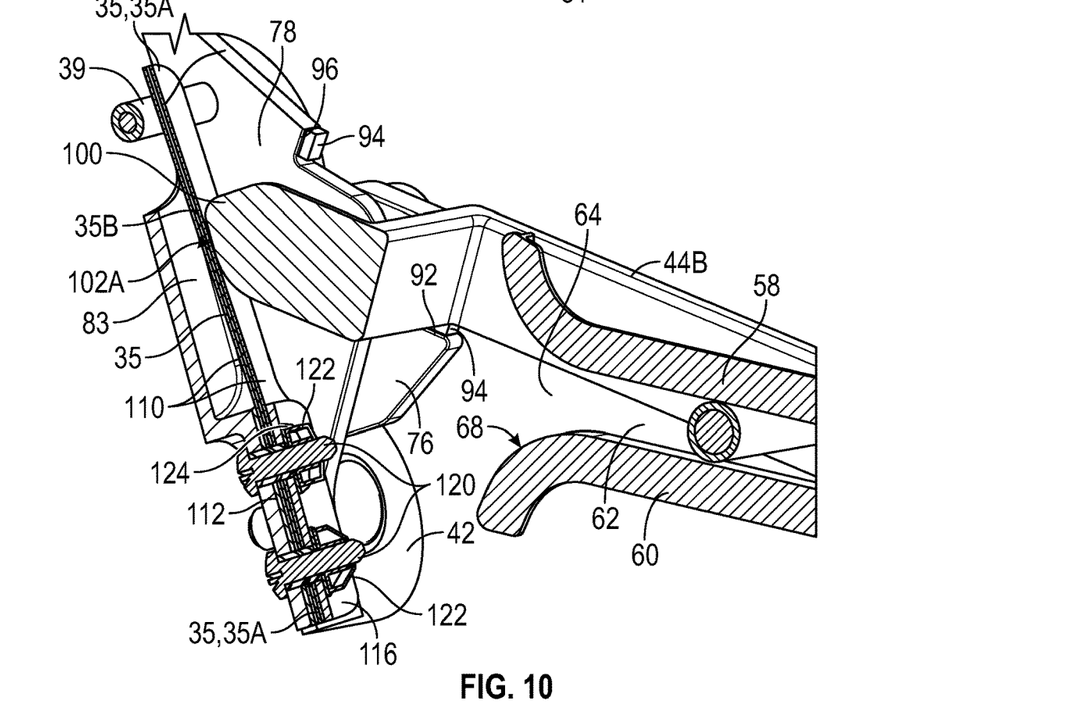
FIG. 10 is a perspective cross-sectional view of the decompression latch assembly taken along lines 10-10 in FIG. 1.
Figure 24:
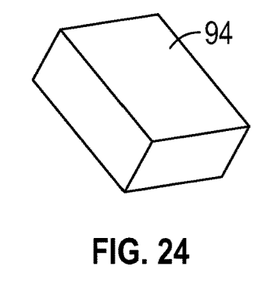
FIG. 24 is a perspective view of a compressible pad for the base of FIG. 3.

The outer supports 76 include stops 92 that prohibit pivoting of the swing arm 44 from the latched position in a direction away from the unlatched position. Stated differently, each outer support 76 acts as a stop that blocks the swing arm 44 from pivoting beyond the latched position. A compressible pad 94 may be disposed on and adhered to the surface of the stop 92 and may interface with the swing arm 44 when the swing arm 44 is in the latched position, dampening any rattle between the swing arm 44 and the stop 92. FIGS. 7, 9 and 10 best show the swing arm 44 interfacing with a compressible pad 94 with the stop 92 blocking further pivoting of the swing arm 44 in a direction away from the unlatched position. One compressible pad 94 is shown in FIG. 24. The compressible pad 94 may be but are not limited to silicone.

Figure 12:
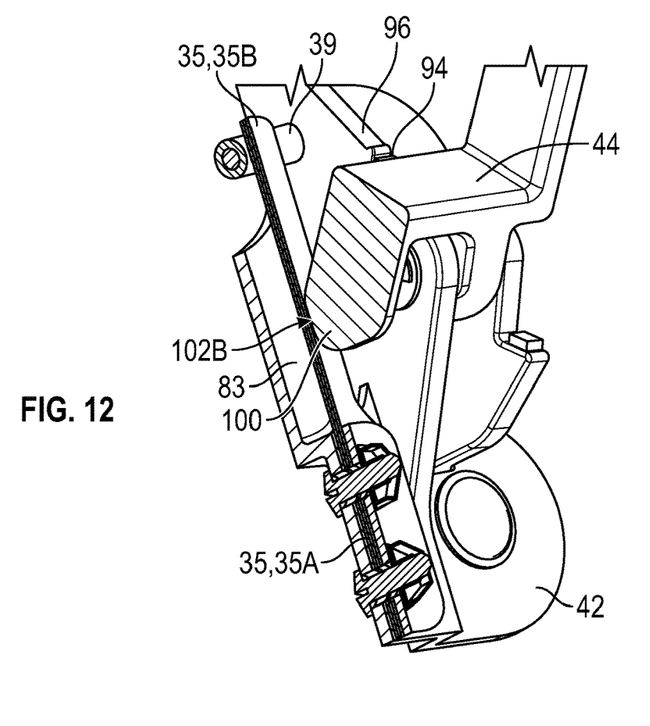
FIG. 12 is perspective cross-sectional view of the decompression latch assembly in a final unlatched position.

Similarly, as shown in FIG. 3, the inner supports 78 include stops 96 that prohibit pivoting of the swing arm 44 from the unlatched position in a direction away from the latched position. Each support 78 acts as a stop that blocks the swing arm 44 from pivoting beyond the unlatched position. A compressible pad 94 may be disposed on and adhered to the surface of the stop 96 and may interface with the swing arm 44 when the swing arm 44 is in the unlatched position, dampening any rattle between the swing arm 44 and the stop 92. FIG. 12 best shows the swing arm 44 interfacing with a compressible pad 94 with the stop 96 blocking further pivoting of the swing arm 44 in a direction away from the unlatched position.

Figure 6:
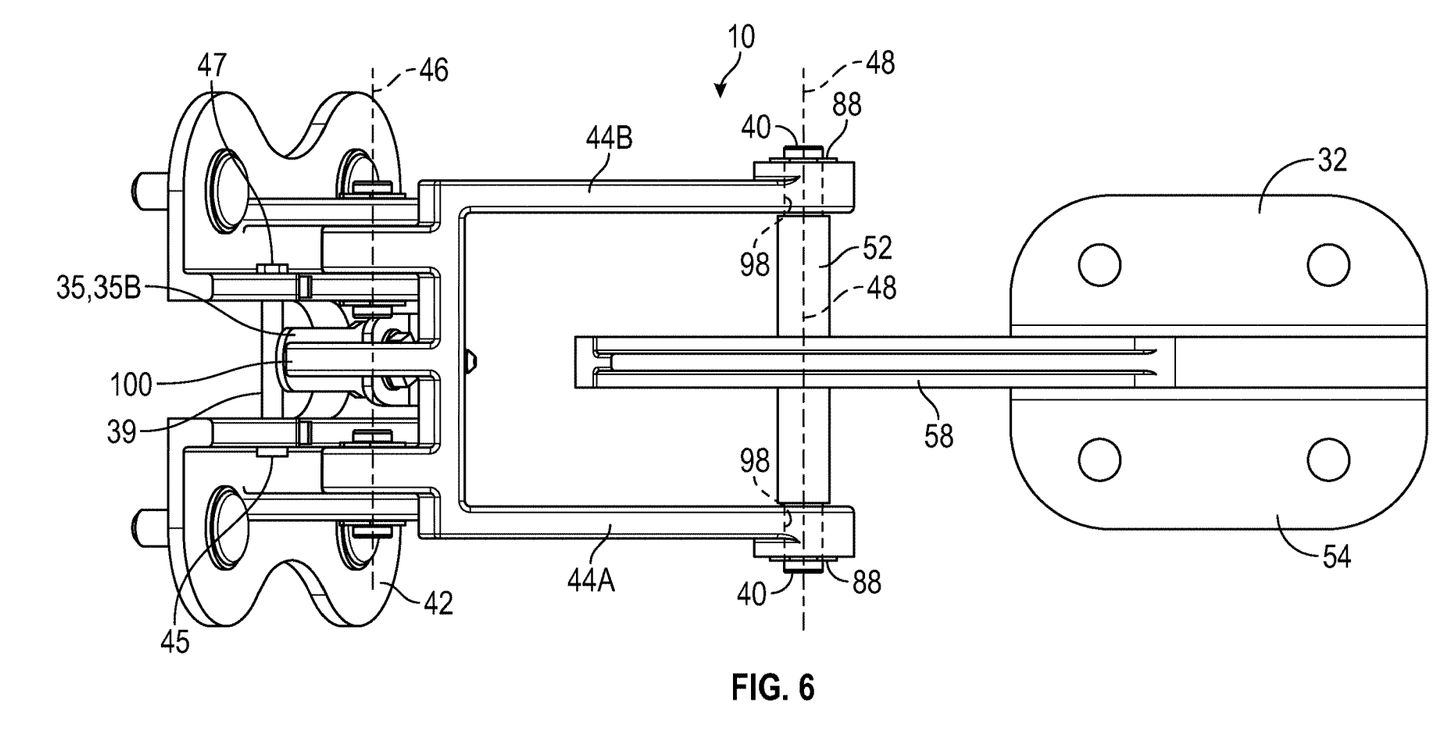
FIG. 6 is a top view of the decompression latch assembly in the latched position.
Figure 11:
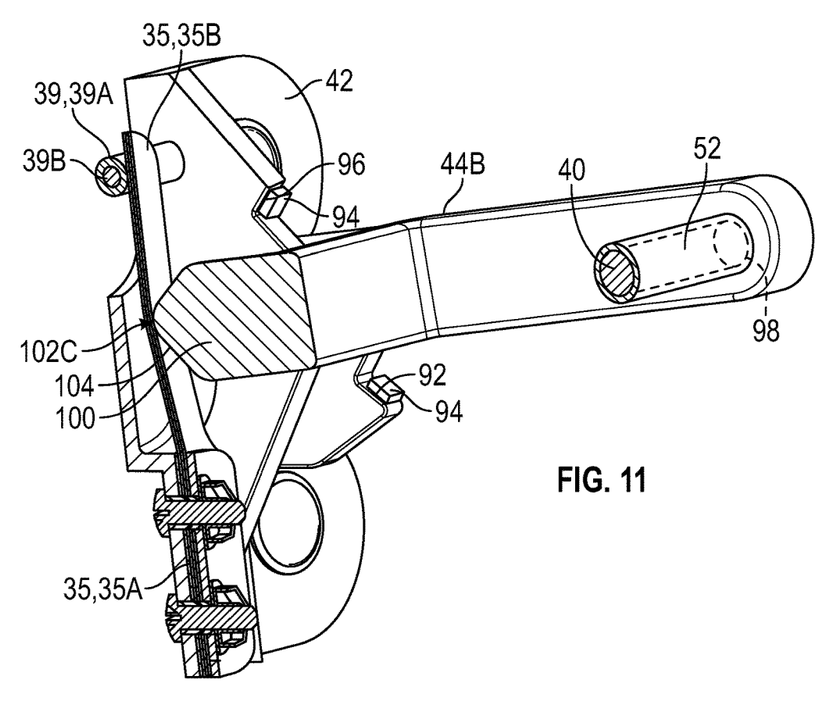
FIG. 11 is a perspective cross-sectional view of the decompression latch assembly in an intermediate unlatched position.
Figure 14:
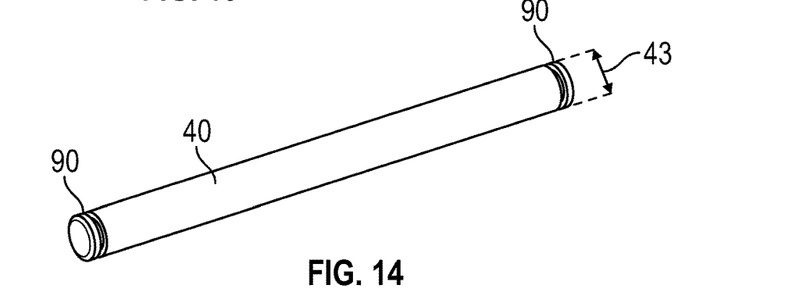
FIG. 14 is a perspective view of the load pin of the decompression latch assembly.

Referring to FIG. 4, the swing arm 44 includes two arm portions 44A and 44B that are spaced apart from one another. Each arm portion 44A, 44B has an opening 98. The openings 98 are aligned to define the pin axis 48. As shown in FIG. 1, the load pin 40 extends through the openings 98. The openings 98 are sized to allow the load pin 40 but not the sleeve 52 to extend therethrough, as shown in FIGS. 6 and 11. Referring to FIG. 14, the load pin 40 has circumferential grooves 90 like those of the hinge pins 82 to receive a C-clip 88 as shown in FIGS. 1 and 7, for example.

Referring again to FIG. 4, the swing arm 44 includes a cam 100 disposed between the two spaced knuckles 84 and extending further than the knuckles 84 away from the ends of the arm portions 44A, 44B that support the load pin 40. The cam 100 has a cam surface 102 with a profile 104 configured to deflect the spring 35 when the swing arm 44 pivots from the latched position to the unlatched position. The profile 104 of the cam 100 is configured such that a maximum deflection of the spring 35 is between the latched position and the unlatched position. For example, referring to FIG. 4, the cam surface 102 includes a first surface portion 102A, a second surface portion 102B, and a tip portion 102C between the first and second surface portions 102A, 102B. When in the latched position, the first surface portion 102A rests against the spring 35 as shown in FIGS. 9 and 10. The cam 100 is configured so that the spring 35 is slightly deflected (e.g., the spring 35 is pushed slightly toward the base 42 between the support end 35B and the fixed end 35A) to provide a preload on the cam 100 to help maintain the swing arm 44 in the latched position and to prevent rattling and wear of the cam 100 against the spring 35 due to the non-triggering relative motion described herein.

When in the unlatched position, the second surface portion 102B rests against the spring 35, as shown in FIG. 12. The cam 100 is configured so that the spring 35 is slightly deflected (e.g., the spring 35 is pushed slightly toward the base 42 between the support end 35B and the fixed end 35A) to provide a preload on the cam 100 to help maintain the swing arm 44 in the unlatched position to prevent rattling and wear due to the non-triggering relative motion.

To move the swing arm 44 from the latched position to the unlatched position, and vice versa, the tip portion 102C of the cam 100 passes over and against the spring 35 (e.g., against the coating 110 thereon). Because the tip portion 102C is the furthest extent of the cam 100 in a direction opposite to that of the direction from the hinge axis 46 to the pin axis 48 (e.g., opposite to the moment arm), the spring 35 will experience maximum deflection due to the swing arm 44 at an intermediate position between the latched position and the unlatched position, as shown in FIG. 11. The cam profile 104 is configured so that the predetermined force PF is that force which causes deflection of the spring 35 by an amount at which the tip portion 102C contacts the spring 35 (e.g., deflects the spring 35 to the intermediate position of FIG. 11). The cam profile 104 thus helps to maintain the swing arm 44 in the latched position until at least a force of a magnitude of the predetermined force PF acts on the load pin 40.

The cam profile 104 is not symmetrical in that the first surface portion 102A is slightly longer than the second surface portion 102B so that the tip portion 102C is slightly skewed in one direction. An asymmetrical marker 106 (see FIG. 4) is provided on one or both of the arm portions 44A to indicate a direction in which the swing arm 44 should be oriented so that the first surface portion 102A interfaces with the spring 35 in the unlatched position. In the example shown, the asymmetrical marker 106 is a triangle with an apex indicating an up direction in which the swing arm 44 should be oriented before inserting the hinge pins 82 through the openings 80.

Referring to FIG. 7, relative motion between the bracket 32 and the base 42 can occur in the horizontal direction X of FIG. 7 along the length 66 of the straight portions 58A, 60A without the load pin 40 exiting from the slot 62. The load pin 40 may thus slide between a closed end 63 of the slot 62 and an inflection of the bars 58, 60 at the end of the straight portion where the bars 58, 60 begin to curve at curved ends 58B, 60B. Relative motion may also occur in the vertical direction Y of FIG. 7, in any amount that results in a force on the load pin 40 by the bracket 32 less than the predetermined force PF, as the spring 35 will prevent the swing arm 44 from moving past the tip portion 102C of the cam profile 104 at such relatively low forces. Accordingly, a pressure differential between the compartments 22, 24 less than the predetermined pressure differential on the decompression panel 26 will not unlatch the decompression latch assembly.

Referring to FIGS. 8-10, the spring 35 is shown as a beam spring having the fixed end 35A and the supported end 35B. The spring 35 is a flat steel spring in the example shown, but in other examples may be a different material and need not be flat. The simplicity of a flat steel spring enables a highly accurate spring force determined by the thickness T of the spring 35, and not requiring bends or other features that may relax and cause a change in spring force over time. Although the spring 35 is depicted as a beam spring with a supported end 35B, in other examples, the spring 35 could instead be a cantilevered beam with a free end (not support rod 39) for example. By configuring the spring 35 as a beam spring with a fixed end 35A and a supported end 35B with the supported end 35B floating on the rod 39 as described, the desired unlatching at the predetermined force PF may be easier accomplished than with a cantilever spring, for example. The thickness T may be reduced in comparison to a cantilever spring with a free end, for example.

Moreover, as a flat spring may be symmetrical, it may be installed with either side facing the cam 100. In an implementation, a coating 110 is disposed on the outer surface of the spring 35, as indicated in FIG. 10. The coating 110 lessens wear that could otherwise occur due to rubbing of the cam 100 of the swing arm 44 against the spring 35 when in the latched position as a result of the normal relative motion of the latch assembly components (e.g., bracket 32 and base 42) during flight, as previously discussed. Because the spring 35 is symmetrical and may be installed with either side facing the cam 100, both sides of the spring 35 are coated. The spring 35 may be a spring stainless steel finished with a zinc-nickel alloy plate, followed by a coat of primer and then the coating 110, which may be but is not limited to polytetrafluoroethylene (PTFE) polyester.

Figure 17:
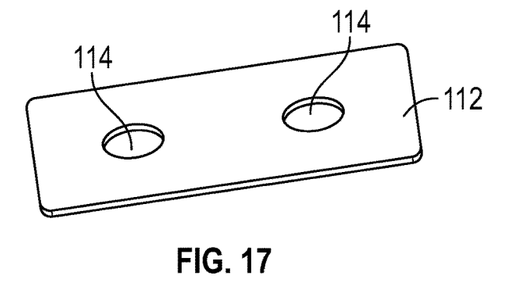
FIG. 17 is a perspective view of a shim for spacing the spring from the base.
Figure 21:
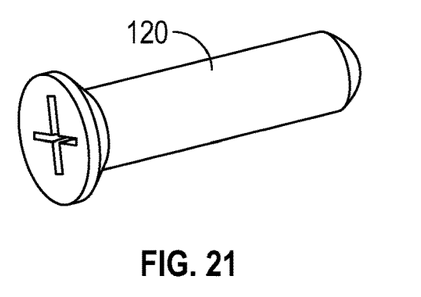
FIG. 21 is a perspective view of a screw for the spring of FIG. 18.

Additionally, a shim 112 may be used, and is shown disposed between the base 42 and the spring 35. The shim 112 is shown in FIG. 17 with fastener openings 114 to allow screws like screw 120 shown in FIG. 21 to extend through the shim 112 when fastening the shim 112 and the spring 35 to the base 42. The shim 112 is used to adjust the spring force exerted by the spring 35 on the swing arm 44. A sum of a thickness of the shim 112 and a thickness of the spring 35 affect the spring force of the spring 35 acting against the swing arm 44 when the swing arm moves from the latched position to the unlatched position. The shim 112 may be a machined aluminum alloy.

Figure 16:
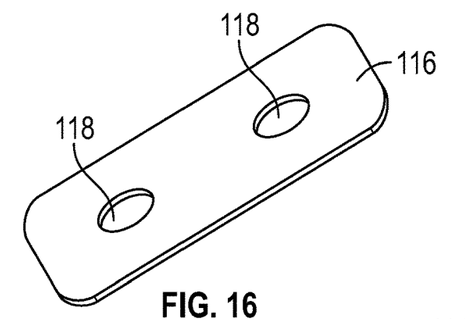
FIG. 16 is a perspective view of a plate for clamping a spring of the decompression latch assembly to the to the base.
Figure 22:
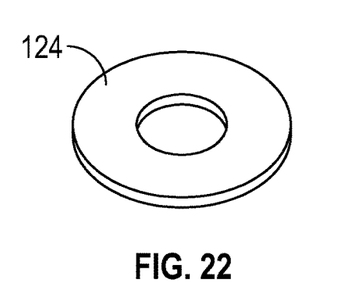
FIG. 22 is a perspective view of a washer for the screw of FIG. 21.
Figure 23:
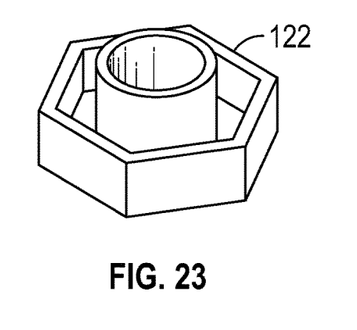
FIG. 23 is a perspective view of a lock nut for the screw of FIG. 21.

A plate 116, referred to as a clamping plate 116, is disposed over the spring 35 nearer to the fixed end 35A of the spring 35 than the supported end 35B of the spring 35. The plate 116 is shown in FIG. 16 with fastener opening 118 that align with the openings 37 of the spring 35 and the openings 114 of the shim 112 so that the plate 116 is securable to the base 42 with the spring 35 sandwiched between the base 42 and the plate 116. The plate 116 may be an aluminum alloy. The plate 116 helps to evenly distribute a securing force at the fixed end 35A of the spring 35. Screws 120 shown in FIG. 10 and FIG. 21 extend through the aligned openings 118, 37, 114 and 79 are secured with lock nuts 122 (one shown in FIG. 23) against washers 124 (also shown in FIG. 22) to tighten the fixed end 35A in place on the base 42. The spring 35 is of a length such that the supported end 35B moves along and stays in contact with the outer surface of the support rod 39 as the swing arm 44 moves from the latched position to the unlatched position and vice versa.

Figure 25:
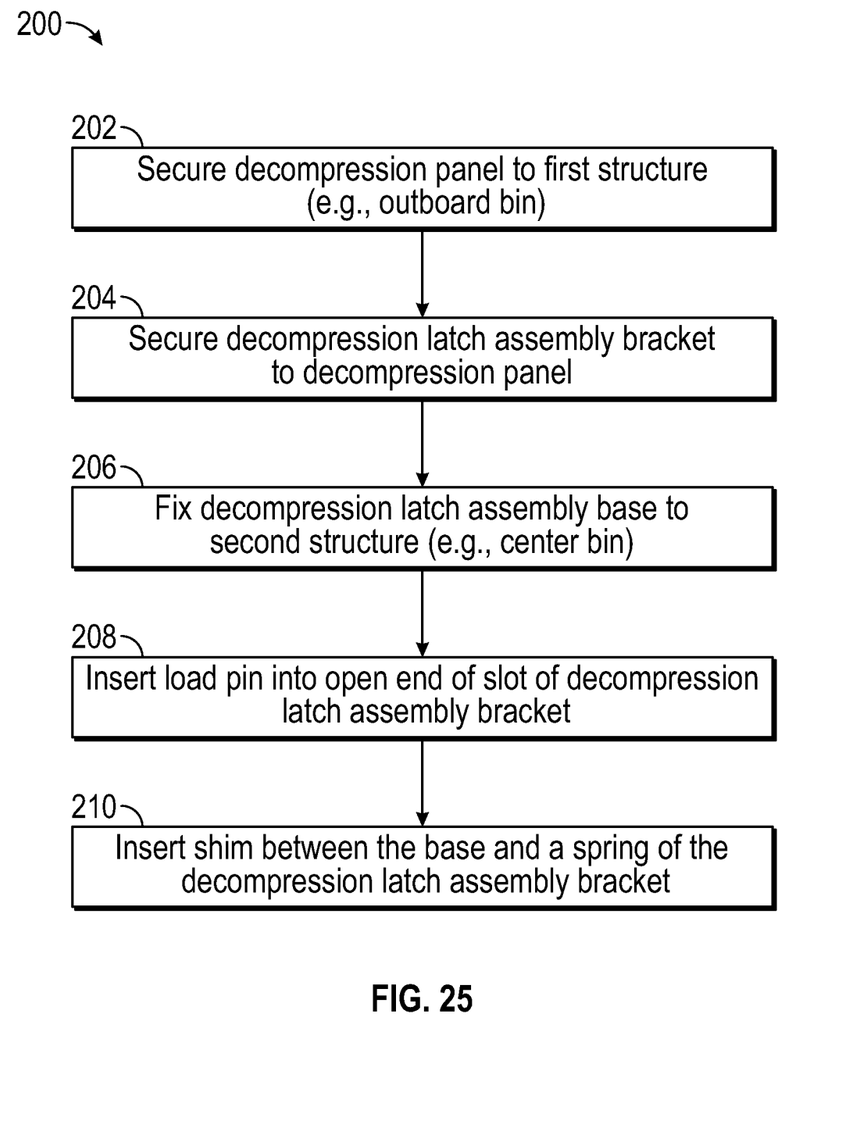
FIG. 25 is a flowchart illustrating a method of installing a decompression latch assembly in an aircraft.

A method 200 of installing the decompression latch assembly in an aircraft is disclosed, and is described with respect to the decompression latch assembly 10 and the aircraft 12. FIG. 25 is a flowchart illustrating the method 200. In an implementation, the method 200 may include step 202, securing the decompression panel 26 to the first structure 16 (e.g., the outboard bin 16) with a fixed latch assembly 28 such that the decompression panel 26 is pivotably secured to the first structure 16 and pivots relative to the first structure 16 at the fixed latch assembly 28. Alternatively, the decompression panel 26 may already be secured to the first structure 16 with the fixed latched assembly 28 when the method 200 begins.

The method 200 includes step 204, securing the bracket 32 of the latch assembly 10 to the decompression panel 26. The bracket 32 defines a slot 62 with an open end 64 opening toward the second structure 18 (e.g., the center bin 18). Stated differently, when securing the bracket 32 to the decompression panel 26, the installer orients the open end 64 toward the second structure 18 instead of toward the first structure 16 (e.g., the outboard bin 16).

The method 200 includes step 206, fixing a base 42 of the latch assembly 10 to the second structure 18. Step 206 may be completed either before or after completing step 204. The method 200 further includes step 208, inserting the load pin 40 into the open end 64 of the slot 62. The load pin 40 is fixed to the swing arm 44 that is hinged to the base 42. The load pin 40 may already be fixed to the swing arm 44 when inserted into the slot 62, and the swing arm 44 may already be hinged to the base 42. The swing arm 44 is pivotable relative to the base 42 between the latched position and the unlatched position when a predetermined force is applied to the load pin by the bracket, and the decompression panel 26 pivots at the fixed latched assembly 28 relative to the first structure 16 when the swing arm 44 pivots from the latched position to the unlatched position. The load pin 40 is movable in the slot 62 under relative motion of the bracket 32 and the base 42 with the swing arm 44 in the latched position.

Additionally, the method 200 may include step 210, inserting a shim 112 between the base 42 and a spring 35 of the latch assembly 10 to adjust a magnitude of a spring force exerted by the spring 35 against the swing arm 44 and a magnitude of the predetermined force PF applied to the load pin 40 at which the swing arm 44 pivots. For example, step 210 may be accomplished if it is determined that the spring force needs to be adjusted to achieve a desired predetermined force PF at which unlatching of the latch assembly 10 is triggered. Alternatively, a shim 112 may already be inserted as described when the method 200 begins, or there may be no shim 112 included in the latch assembly.

Accordingly, the decompression latch assembly 10 disclosed herein is able to respond to relative motion between components of the aircraft 12 caused by turbulence for example, without a variation in the force necessary to unlatch the decompression latch assembly 10. The decompression latch assembly 10 opens at a predetermined pressure differential between two compartments in the aircraft 12 that results in a predetermined force PF on the load pin 40 by unlatching regardless of the relative position of the load pin 40 in the slot 62 of the bracket 32, allowing the decompression panel 26 to pivot into the second compartment 24 to vent the first compartment 22.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A latch assembly for a decompression panel in an aircraft, the latch assembly comprising:
a base;
a swing arm hinged to the base and pivotable relative to the base between a latched position and an unlatched position; a load pin fixed to the swing arm;
a spring secured to the base and positioned to exert a spring force against the swing arm when the swing arm pivots from the latched position to the unlatched position; and
a bracket securable to the decompression panel, the bracket defining a slot having an open end, the bracket configured to retain the load pin in the slot when the swing arm is in the latched position, the load pin movable in the slot under relative motion of the bracket and the base with the swing arm in the latched position, and the load pin configured to exit the open end of the slot when the swing arm pivots from the latched position to the unlatched position under a predetermined force of the bracket on the load pin due to a pressure differential on the decompression panel, the predetermined force of the bracket on the load pin creating a moment on the swing arm that overcomes the spring force.

2. The latch assembly of claim 1, wherein:
the swing arm is pivotable relative to the base about a hinge axis between the latched position and the unlatched position; and
the load pin has a pin axis a fixed distance from the hinge axis.

3. The latch assembly of claim 1, further comprising:
a support rod fixed to the base;
wherein the spring is a beam spring having a fixed end and a supported end floating on the support rod, and the spring deflects between the fixed end and the supported end when the swing arm pivots from the latched position to the unlatched position.

4. The latch assembly of claim 3, wherein the spring is a flat spring.

5. The latch assembly of claim 4, wherein the spring is steel, and the latch assembly further comprising:
a coating disposed on the spring; and
wherein the swing arm contacts the coating when pivoting from the unlatched position to the latched position.

6. The latch assembly of claim 4, further comprising:
a shim disposed between the base and the spring.

7. The latch assembly of claim 4, further comprising:
a plate disposed over the spring nearer to the fixed end of the spring than the supported end of the spring; wherein the plate is securable to the base with the spring sandwiched between the base and the plate.

8. The latch assembly of claim 1, wherein the spring exerts a preload on the swing arm when the swing arm is in the latched position or when the swing arm is in the unlatched position.

9. The latch assembly of claim 1, wherein the swing arm includes a cam having a profile configured to deflect the spring when the swing arm pivots from the latched position to the unlatched position.

10. The latch assembly of claim 9, wherein the profile of the cam is configured such that a maximum deflection of the spring is between the latched position and the unlatched position.

11. The latch assembly of claim 1, further comprising:
a sleeve disposed around the load pin such that the sleeve interfaces with the bracket in the slot.

12. The latch assembly of claim 1, wherein the base includes a support prohibiting pivoting of the swing arm from the latched position in a direction away from the unlatched position or from the unlatched position in a direction away from the latched position.

13. The latch assembly of claim 12, further comprising:
a compressible pad disposed on the support and configured to interface with the swing arm.

14. An aircraft decompression system for an aircraft having a fuselage, a first structure within the fuselage, and a second structure within the fuselage and spaced apart from the first structure, the fuselage, the first structure, and the second structure defining a first space and a second space, and the aircraft decompression system comprising:
a decompression panel pivotably secured to the first structure and configured to at least partially span an opening between the first structure and the second structure in a closed position to at least partially separate the first space from the second space; and
a latch assembly including:
a base fixed to the second structure;
a swing arm hinged to the base and pivotable relative to the base between a latched position and an unlatched position, the decompression panel being in the closed position when the swing arm is in the latched position;
a load pin fixed to the swing arm;
a spring secured to the base and positioned to exert a spring force against the swing arm when the swing arm pivots from the latched position to the unlatched position; and
a bracket secured to the decompression panel, the bracket defining a slot having an open end, the bracket retaining the load pin in the slot when the swing arm is in the latched position, the load pin movable in the slot under relative motion of the bracket and the base with the swing arm in the latched position, and the load pin releasing from the bracket out of the open end of the slot when the swing arm pivots from the latched position to the unlatched position under a predetermined force of the bracket on the load pin due to a positive pressure differential between the first space and the second space, the predetermined force of the bracket on the load pin creating a moment on the swing arm that overcomes the spring force, the decompression panel pivoting away from the opening into the second space.

15. The aircraft decompression system of claim 14, wherein the latch assembly is disposed in the second space both when the latch assembly is in the latched position and when the latch assembly is in the unlatched position.

16. The aircraft decompression system of claim 15, further comprising:
a fixed latch assembly pivotably securing the decompression panel to the first structure; wherein the decompression panel pivots at the fixed latch assembly when the decompression panel pivots away from the opening into the second space.

17. The aircraft decompression system of claim 14, wherein the first structure is an outboard bin, the second structure is an inboard bin, the first space is a passenger cabin, the second space is a crown space, and the decompression panel is a ceiling panel.

18. A method of installing a decompression latch assembly in an aircraft, the aircraft having a fuselage, a first structure, a second structure, and a decompression panel within the fuselage;
   wherein the fuselage, the first structure, and the second structure at least partially define a first space and a second space within the fuselage, and the decompression panel at least partially spans an opening between the first structure and the second structure in a closed position of the decompression panel to at least partially separate the first space from the second space, the method comprising:
   securing a bracket of the latch assembly to the decompression panel;
   wherein the bracket defines a slot with an open end opening toward the second structure; fixing a base of the latch assembly to the second structure;
   inserting a load pin into the open end of the slot;
   wherein the load pin is fixed to a swing arm that is hinged to the base;
   wherein the swing arm is configured to be pivotable relative to the base between a latched position and an unlatched position when a predetermined force from a pressure differential is applied to the load pin by the bracket; and
   wherein the load pin is movable in the slot under relative motion of the bracket and the base with the swing arm in the latched position.

19. The method of claim 18, further comprising:
   securing the decompression panel to the first structure with a fixed latch assembly such that the decompression panel is pivotably secured to the first structure and pivots relative to the first structure at the fixed latch assembly when the swing arm pivots from the latched position to the unlatched position.

20. The method of claim 18, further comprising:
   inserting a shim between the base and a spring of the latch assembly to adjust a magnitude of a spring force exerted by the spring against the swing arm and a magnitude of the predetermined force applied to the load pin at which the swing arm pivots.

\* \* \* \* \*